United States Patent
Farkas et al.

(10) Patent No.: US 6,354,140 B1
(45) Date of Patent: Mar. 12, 2002

(54) FLUID LEAKAGE DETECTOR FOR VACUUM APPLICATIONS

(75) Inventors: Tibor Farkas, Orange; Brian Byungkyu Kim, La Mirada; Bich Ngoc Nguyen, Los Angeles, all of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/663,610

(22) Filed: Sep. 18, 2000

(51) Int. Cl.$^7$ .................................................. G01M 3/08
(52) U.S. Cl. ......................... 73/40.5 R; 73/46; 73/49.1
(58) Field of Search .............................. 73/40.5 R, 46, 73/49.1

(56) References Cited

U.S. PATENT DOCUMENTS

| | | | | |
|---|---|---|---|---|
| 3,280,620 A | * | 10/1966 | Anderson | 73/40.5 |
| 3,316,752 A | * | 5/1967 | Mitchell | 73/40.5 |
| 3,864,960 A | * | 2/1975 | Fletcher et al. | 73/46 |
| 4,041,771 A | * | 8/1977 | Allan et al. | 73/40.5 R |
| 4,206,632 A | | 6/1980 | Suzuki | |
| 4,487,057 A | * | 12/1984 | Lutz | 73/40.5 R |
| 4,500,865 A | | 2/1985 | Tanaka et al. | |
| 4,534,662 A | | 8/1985 | Barlian | |
| 4,910,998 A | * | 3/1990 | Willis et al. | 73/40.5 R |
| 4,926,680 A | * | 5/1990 | Hasha et al. | 73/46 |
| 4,939,923 A | * | 7/1990 | Sharp | 73/40.5 R |
| 5,067,094 A | * | 11/1991 | Hayes | 364/510 |
| 5,176,025 A | * | 1/1993 | Butts | 73/40.5 R |
| 5,203,202 A | | 4/1993 | Spencer | |
| 5,301,538 A | * | 4/1994 | Recla | 73/40.5 R |
| 5,378,995 A | | 1/1995 | Kudo et al. | |
| 5,561,418 A | * | 10/1996 | Croft et al. | 340/605 |
| 5,637,789 A | | 6/1997 | Lawson | |
| 5,979,227 A | * | 11/1999 | Lawson et al. | 73/46 |
| 6,112,580 A | * | 9/2000 | Hesky | 73/49.1 |

OTHER PUBLICATIONS

Publication entitled "Absolute Zero!" by Michael Lea; publication date unknown.

Publication entitled "Fuel Leak Detection with Diode Laser Absorption" by Michael Webber; publication date unknown.

Publication entitled "Personal Dosimeter Bade for Monitoring Exposure to Hydrazine Fuel Vapors at Rocket Launch Sites"; author unknown; publication date unknown.

Publication entitled "Real–Time Detectors for Sub 10 ppb Hydrazine Fuel Vapor Monitoring at CCAS and VAFB"; author unknown; publication date unknown.

Publication entitled "CF2/Hydrazine"; author unknown; publication date unknown.

Publication entitled "About Inclined Orbit"; author unknown; publication date unknown.

Publication entitled "Improving Safety and Reliability of Space Auxiliary Power Units" by Dr. Larry A. Viterna; updated Apr. 16, 1998.

Publication entitled "Auxiliary Power Units"; author unknown; updated Feb. 1, 1995.

Publication entitled "Propellants Applications"; author unknown; publishing date unknown.

* cited by examiner

*Primary Examiner*—Hezron Williams
*Assistant Examiner*—C D. Garber
(74) *Attorney, Agent, or Firm*—Harness Dickey & Pierce P.L.C.

(57) ABSTRACT

A leak detection system for use with a fluid conducting system in a vacuum environment, such as space, is described. The system preferably includes a mesh-like member substantially disposed about the fluid conducting system, and at least one sensor disposed within the mesh-like member. The sensor is capable of detecting a decrease in temperature of the mesh-like member when a leak condition causes the fluid of the fluid conducting system to freeze when exposed to the vacuum environment. Additionally, a signal processor in preferably in communication with the sensor. The sensor transmits an electrical signal to the signal processor such that the signal processor is capable of indicating the location of the fluid leak in the fluid conducting system.

10 Claims, 2 Drawing Sheets

FLUID LEAKAGE DETECTOR FOR VACUUM APPLICATIONS

GOVERNMENT INTERESTS

This invention was made with government support under Contract No. NAS9-20000, awarded by NASA to The Boeing Company, and the United States Government has certain rights in this invention.

TECHNICAL FIELD

The present invention relates generally to fluid conducting systems, and more particularly to an improved leak detection system for use with various types of fluid conducting systems operating in vacuum environments, such as space.

BACKGROUND OF THE INVENTION

With respect to current space vehicles, such as the Space Shuttle, there has been increased interest in ensuring that any leaks in the vehicle's fluid conducting systems are immediately-identified and quickly eliminated in order to prevent any catastrophic accidents or mission interruptions. For example, a leak of the vehicle's fuel system could jeopardize the safety of the crew or cause the shortening of the mission duration.

All fluid conducting systems, whether ground- or space-based, generally consist of a combination of pipes or conduits, joints, valves, fittings, and various other plumbing devices. Any one of these components can become a leak source during routine operation of the fluid conducting system. There are many commercially available leak detectors for ground-based operations, but effective detectors for space/vacuum use are not readily available because fluid behaves vastly differently in vacuum. Because the usage of space vehicles, such as the Space Shuttle, as well as satellites, rockets, and space stations, has recently increased to a substantial degree, the need for a reliable leak detector in a vacuum environment, such as that found in space, has increased as well.

The majority of existing leak detectors require direct contact with the leaking substance in the form of a vapor or liquid, and typically relies on a chemical reaction. Most of the readily available leak detectors and indicators utilize chemically reactive substances. For example, a sample of air or vapor is collected and introduced to a chemically sensitive substance (e.g., a reagent). The chemical reaction (e.g., electrical conductivity, pH balance, heat release, etc.) is measured and then used to quantify the particular leak.

However, this methodology can not work in the high vacuum conditions of space because fluid freezes instantly (i.e., flash freezes) as it is introduced into the vacuum environment and does not produce vapor. A leak detector which uses chemical sensing and is located even next to the source cannot detect a leak in vacuum. Thus, leak detectors designed for ground-based operation are completely useless for space-based operations.

Therefore there exists a need for a reliable, inexpensive, and easy to manufacture leak detection system that is capable of detecting fluid leaks in vacuum environments, such as those encountered during space-based operations.

BACKGROUND ART

The following U.S. Patents contain information relating generally to the background of the present invention, the entire disclosures of all of which are incorporated herein by reference:

U.S. Pat. No. 5,637,789 discloses a downstream leak detection system for use with pipeline systems, especially those of residential type. The system makes use of a single thermistor, or other sensing element, to detect extraneous fluid flow via thermal transport. The leakage rate may be set over a wide range, and an alarm is activated when the desired leak flow rate is detected over a predetermined time interval.

U.S. Pat. No. 5,378,995 discloses a low molecular weight organic liquid detection sensor which is a wire body formed by coating a core material with a conductive layer made of a substantially non-crosslinked material having a Shore A hardness not more than 70 which is mainly composed of thermoplastic elastomer and conductive carbon, the conductive layer varying in its electric resistance upon contact with a low molecular weight organic liquid. The sensor of the invention permits secured mechanical strength, its easy installation in a narrow conduit or over a wide area, and highly sensitive sensing of a low molecular weight organic liquid in the longitudinal direction. The detector of the invention comprises a sensor having the above structure, preferably a porous body which houses and protects the sensor, a means which is connected to this sensor and detects electric resistance variation, and a means for transmitting this electric resistance variation as an alarm signal, and the detector can be used in the presence of underground water, which in turn permits use of existing liquid-leakage detection holes and installation at low costs.

U.S. Pat. No. 5,203,202 discloses a leak detection assembly that employs a layer of pliable conductive construction between a fluid conduit or tube and a tape containing signal carrying elements disposed along the length of the tape. The signal carrying element can be a series of parallel electrical conductors disposed longitudinally.

U.S. Pat. No. 4,5334,662 discloses a device used for detecting leakages of steam contained in hollow bodies, particularly in pipes. It is intended for tending high temperature steam conduits. The hollow body is surrounded by a thermal insulation containing a measuring chamber. A temperature sensor and a steam detector are disposed within that measuring chamber. Signaling apparatus announces the simultaneous presence of steam and temperature drop. When the pressurized steam contained in the hollow body or in the conduit happens to leak, it expands thereby producing a temperature drop. The sensing of both effects, i.e. the temperature drop and the presence of vapor avoids erroneous warnings.

U.S. Pat. No. 4,500,865 discloses a fluid leakage detecting element comprising a heat generating resistive member and a temperature compensating resistive member disposed on a substrate. Each of the resistive members is prepared in the form of a paste of a metal which has a high temperature coefficient and a high thermal conductivity and whose melting point is higher than the baking temperature of the substrate. These resistive members are printed in thick film form on the substrate which is sufficiently electrical insulating and has a high thermal conductivity.

U.S. Pat. No. 4,206,632 discloses a liquid leak detecting device comprising at least two electrical conductors arranged in parallel and separated from each other by a material comprised of continuously porous polytetrafluoroethylene containing an electroconductive material within its pores.

OBJECTS AND SUMMARY OF THE INVENTION

It is therefore a principal object of this invention to provide a new and improved leak detection system.

It is another object of this invention to provide a new and improved leak detection system for use with fluid conducting systems.

It is another object of this invention to provide a new and improved leak detection system for use with fluid conducting systems that operate in vacuum environments.

It is another object of this invention to provide a new and improved leak detection system that takes advantage of the phenomenon of flash freezing of fluids in vacuum environments.

It is another object of this invention to provide a new and improved leak detection system for use with fluid conducting systems that operate in space-based environments.

In accordance with one embodiment of the present invention, a leak detection system for use with a fluid conducting system in a vacuum environment is provided, comprising:

a member adjacent to the fluid conducting system; and at least one sensor disposed within the member;

wherein the at least one sensor is capable of detecting a decrease in temperature of the member when a leak condition causes the fluid of the fluid conducting system to freeze when exposed to the vacuum environment.

In accordance with another embodiment of the present invention, a leak detection system for use with a fluid conducting system in a vacuum environment is provided, comprising:

a member substantially disposed about the fluid conducting system; and at least one sensor disposed within the member;

wherein the at least one sensor is capable of detecting a decrease in temperature of the member when a leak condition causes the fluid of the fluid conducting system to freeze when exposed to the vacuum environment.

In accordance with still another embodiment of the present invention, a leak detection system for use with a fluid conducting system in a vacuum environment is provided, comprising:

a substantially open-celled mesh-like member substantially disposed about the fluid conducting system; and at least one sensor disposed within the mesh-like member;

a signal processor in communication with the at least one sensor;

wherein the at least one sensor is capable of detecting a decrease in temperature of the mesh-like member when a leak condition causes the fluid of the fluid conducting system to freeze when exposed to the vacuum environment;

wherein the at least one sensor transmits an electrical signal to the signal processor such that the signal processor is capable of indicating the location of the fluid leak in the fluid conducting system.

These and other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference of characters.

DETAILED DESCRIPTION OF THE PREFERRED EMBODIMENTS

Although the present invention is directed primarily to the use of new and improved leak detection system for use with a fluid conducting system used in conjunction with space-based applications, it should appreciated that the present invention is equally suitable for practice with any type of fluid conducting system operating in a vacuum environment, such that the leaking fluid exhibits flash freezing characteristics when exposed to the vacuum environment.

Figure 1:
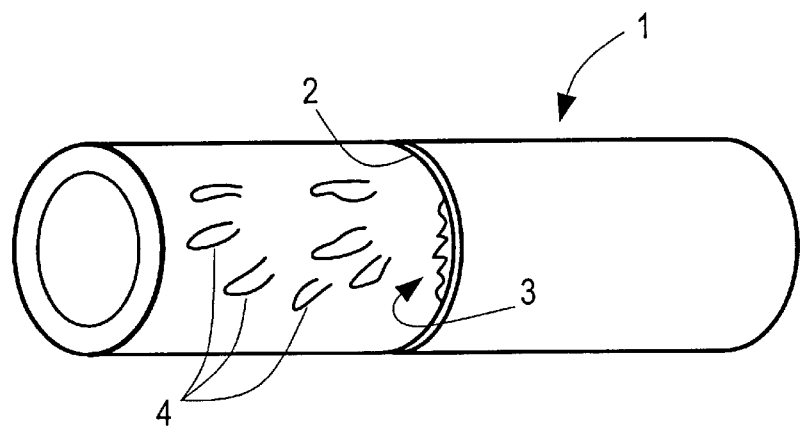
FIG. 1 is a partial perspective view of a pipe exhibiting a leak condition in a vacuum environment, in accordance with the prior art.

The leak detection system of the present invention detects and measures temperature changes due to the resulting flash-freezing of the leaking fluid when exposed to the vacuum environment typically encountered during space-based operations. As previously noted, when a fluid exits (e.g., by leaking) its container (e.g., a pipe or conduit) into a vacuum, the fluid flash freezes and draws heat out of itself and its respective container to support the rapid vaporization and freezing. Flash freezing is a rapid and uncontrolled process, highly leakage-rate dependent, and results in ice or snow being formed near the source or at random locations away from the source of the leak. Therefore, placement of a sensor to detect temperature changes (caused by the formation of the snow or ice) is not likely to lead to reliable detection. By way of a non-limiting example, reference is made to FIG. 1, which illustrates a pipe 1 having a joint 2 with a crack or leak 3 therein allows the fluid to escape into the vacuum environment and flash-freeze thus causing the formation of ice or snow accumulations 4 at remote and random locations on the pipe 1, or any surrounding surface of the vehicle for that matter.

Based on the concept of controlling the location of the freezing process, the leak detection system of the present invention employs and indeed takes advantage of the phenomenon of flash freezing of fluids in vacuum.

Figure 2:
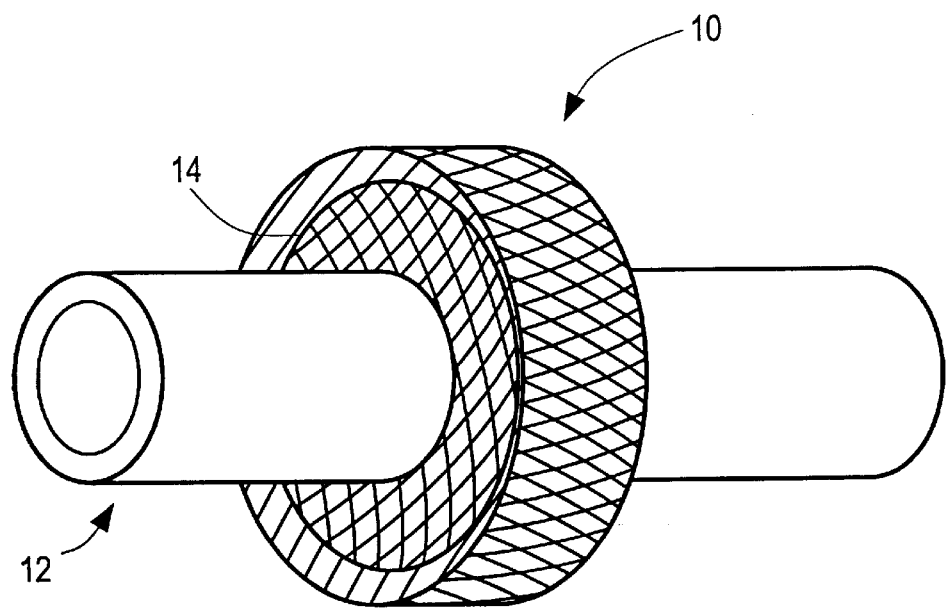
FIG. 2 is a partial perspective view of a pipe equipped with a leak detection system, in accordance with one embodiment of the present invention.

With reference to FIG. 2, and in accordance with one embodiment of the present invention, a member 10 is preferably positioned adjacent to, and more preferably disposed about a fluid conducting system, or component thereof, such as a pipe or conduit 12. The member 10 is preferably a thermally-conductive, coarse, substantially open-celled metal mesh 14 surrounding a potential leak area, such as a joint (not shown) formed at the junction of two or more pipes or conduits. The size and density of the metal mesh 14 can be optimized for specific fluid properties and levels of leakage to be detected.

When the fluid leaks and flash-freezes, the member 10 traps the ice (e.g., within the metal mesh 14 structure) without interfering with the freezing process or the local vacuum condition. Thus, the location of the freezing is controlled, i.e., the ice forms primarily in the metal mesh 14 as opposed to remote and random locations around the leak location.

Figure 3:
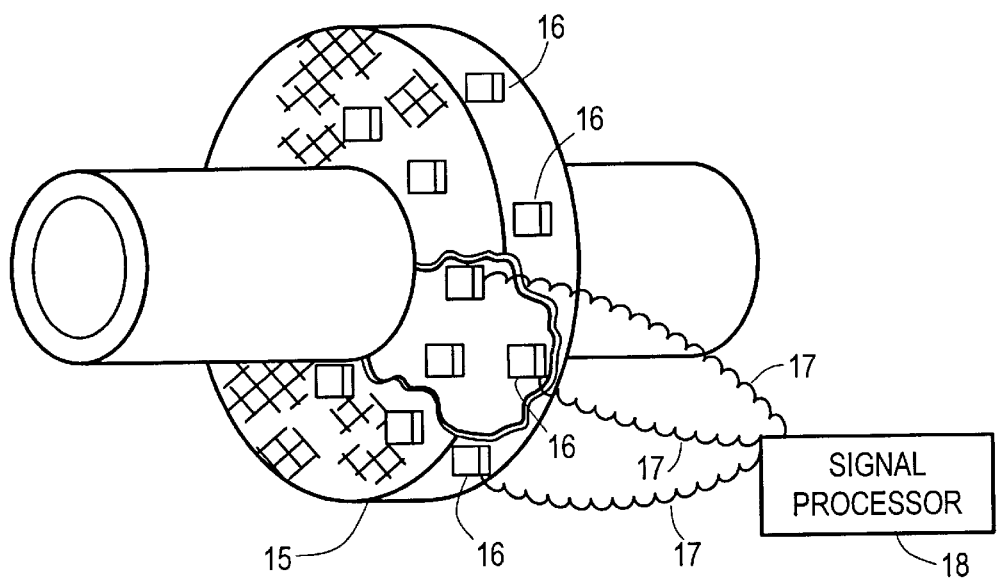
FIG. 3 is a partial perspective view of a pipe equipped with a leak detection system exhibiting a leak condition in a vacuum environment, in accordance with one embodiment of the present invention.

With reference to FIG. 3, the radical temperature variation due to the freeze-up 15 (i.e. accumulation of ice) is effectively conducted through the metal mesh 14 to preferably one or more temperature sensor(s) 16 disposed within, or otherwise embedded in, the metal mesh 14 to detect the temperature change. Any number of readily commercially available temperature sensors may be employed and embedded in the metal mesh 14 to provide a more accurate, reliable, and responsive sensor in a vacuum environment.

The sensor(s) 16 then preferably transmits electrical signals (via wires or cables 17) to a signal processor 18 that interprets the signals and is capable of determining the temperature change and the location of the leak. Although only some of the sensors 16 are shown in communication with the signal processor 18, it should be appreciated that if multiple sensors are employed, then all of the sensors 16 should be in communication with the signal processor 18.

Accordingly, by employing the leak detection system of the present invention, the crew of the vehicle can be immediately alerted to the presence of a leak condition in any of the fluid conducting systems on board the vehicle, and can take immediate corrective action to abate the harm occasioned by the leak condition.

In order to demonstrate the effectiveness of the leak detection system of the present invention, several tests in vacuum were conducted with a simulated leaky joint, using water as the fluid. The protocol of one such test is present in the Example, below:

EXAMPLE

The proposed leak detector was placed in the vacuum chamber, and a high vacuum was pulled (<19E-2 torr). Temperature probes were placed on the tube joint surfaces well as the metal mesh member surrounding it. The test results showed the freezing was controlled within the metal mesh member. Leak rate was varied between drops and sprays. The fuel line was tested both in static/flowing and heated/unheated configurations.

Figure 4:
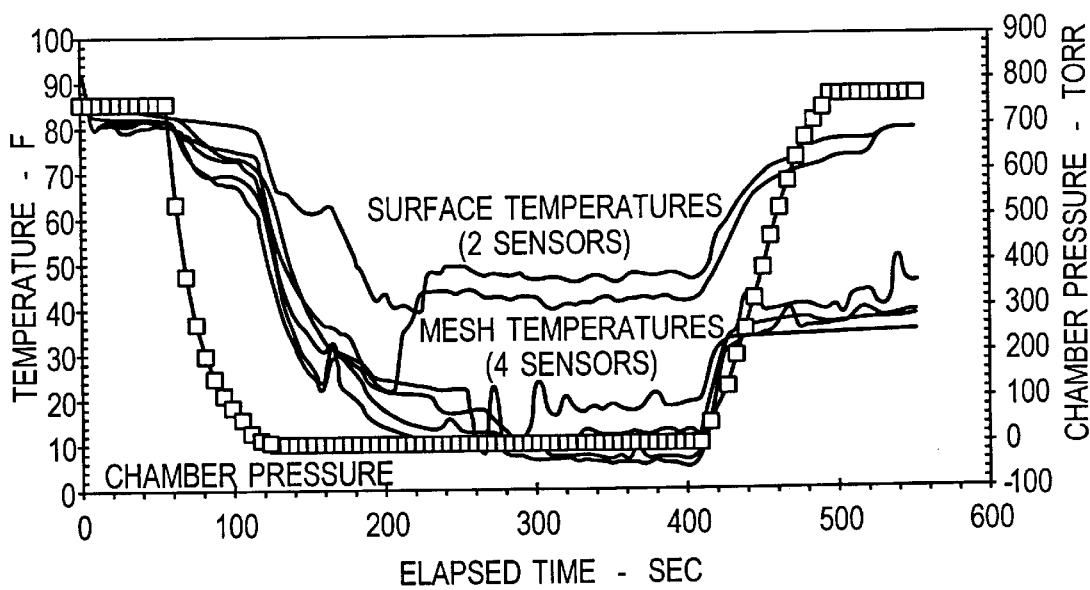
FIG. 4 is a graphical illustration comparing the surface temperature and the mesh temperature during a leak condition in a vacuum environment, in accordance with one embodiment of the present invention.

The temperatures within the metal mesh member were consistently 20–30° F. lower than the surface temperatures with a very distinguishable pattern approaching the freezing temperature of water (see FIG. 4). For purposes of comparison, temperature probes placed at different distances from the leak source outside the metal mesh member and showed readings that were random and did not show any pattern or any detectable cooling.

Currently, space vehicles do not have effective leak detection systems which detect fluid leaks in vacuum or space environments. The leak detection system of the present invention will provide high visibility to leaks in a vacuum environment thus preventing possible accidents due to a fluid leak in space vehicles. Furthermore, the leak detection system of the present invention is compatible with, and applicable to, all fluid conducting systems on the Space Shuttle Orbiter, the International Space Station and other projects which are currently being developed by the aerospace industry. For example, satellites and other unmanned space vehicles which contain fluid lines may use the leak detection system of the present invention to monitor for leaks.

Even though the leak detection system of the present invention is primarily intended to function as a safety device, it nonetheless produces substantial economic benefits by permitting the early detection of leaks which allows for failure isolation, corrective action, and thus aids in the prevention of a hazardous and costly accident.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A leak detection system for use with a fluid conducting system, comprising:

a member comprised of a substantially open-celled mesh-like material adjacent to the fluid conducting system; and a plurality of sensors disposed within the member wherein at least one of said plurality of sensors detects a decrease in temperature of the member when a leak condition causes the fluid of the fluid conducting system to flash freeze in proximity to the member when exposed to a vacuum environment.

2. The invention according to claim 1, wherein the member is metallic.

3. The invention according to claim 1, further comprising a signal processor in communication with the at least one sensor.

4. The invention according to claim 3, wherein the at least one sensor transmits an electrical signal to the signal processor such that the signal processor is capable of indicating the location of the fluid leak in the fluid conducting system.

5. A leak detection system for use with a fluid conducting system, comprising:

a member comprised of a substantially open-celled mesh-like material substantially disposed about the fluid conducting system; and a plurality of sensors disposed within the member wherein at least one of said plurality of sensors detects a decrease in temperature of the member when a leak condition causes the fluid of the fluid conducting system to flash freeze in proximity to the member when exposed to a vacuum environment.

6. The invention according to claim 1, wherein the member is metallic.

7. The invention according to claim 5, further comprising a signal processor in communication with the at least one sensor.

8. The invention according to claim 7, wherein the at least one sensor transmits an electrical signal to the signal processor such that the signal processor is capable of indicating the location of the fluid leak in the fluid conducting system.

9. A leak detection system for use with a fluid conducting system, comprising:

a substantially open-celled mesh-like member substantially disposed about the fluid conducting system;

a plurality of sensors disposed within the mesh-like member; and a signal processor in communication with at least one of said plurality of sensors;

wherein at least one of said plurality of sensors detects a decrease in temperature of the open-celled mesh-like member when a leak condition causes the fluid of the fluid conducting system to flash freeze in proximity to the open-celled mesh-like member when exposed to a vacuum environment;

wherein at least one of said plurality of sensors transmits an electrical signal to the signal processor such that the signal processor is capable of indicating the location of the fluid leak in the fluid conducting system.

10. The invention according to claim 9, wherein the member is metallic.

* * * * *